Figure 1:
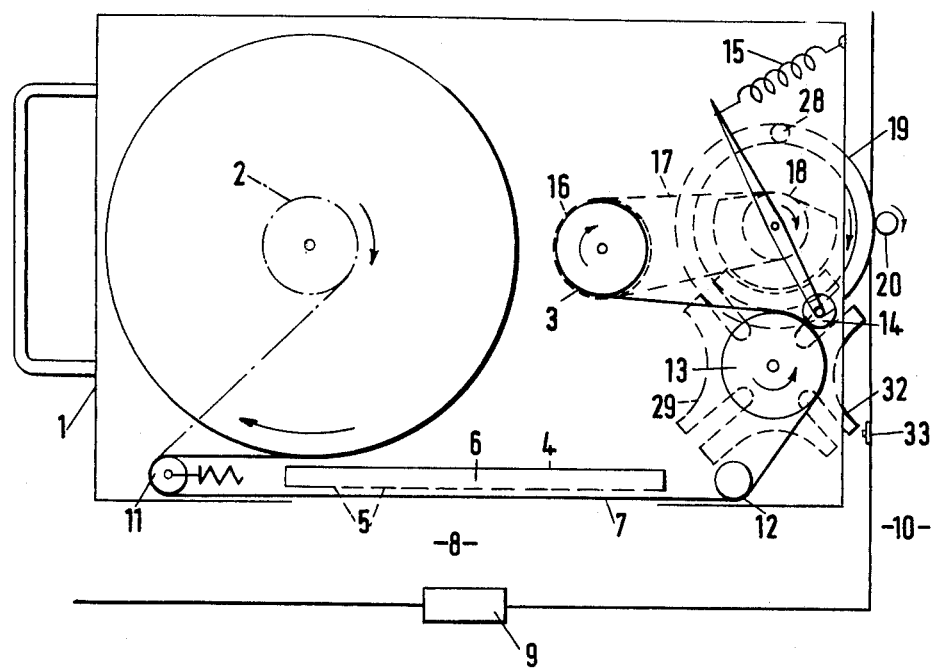

United States Patent [19]

Spence-Bate

[11] 4,042,300
[45] Aug. 16, 1977

[54] SELF-CONTAINED SINGLE OR MULTIPLE CASSETTES AND DRIVES

[76] Inventor: Harry Arthur Hele Spence-Bate, 1 Cheam Place, Morely, Australia, 6062

[21] Appl. No.: 595,780

[22] Filed: July 14, 1975

[30] Foreign Application Priority Data

July 18, 1974  Australia .................. 71404/74

[51] Int. Cl.² ............................... G03B 27/60
[52] U.S. Cl. .......................... 355/73; 354/174;
354/276; 352/78 R
[58] Field of Search ........... 355/73; 352/78 R, 222;
354/276, 277, 285, 174, 178

[56] References Cited
U.S. PATENT DOCUMENTS

| 458,907 | 9/1891 | Kipper et al. | 354/174 |
|---|---|---|---|
| 2,500,251 | 3/1950 | Hood | 354/174 |
| 2,630,743 | 3/1953 | O'Kane | 352/222 |
| 3,528,356 | 9/1970 | Eagle | 352/222 |

*Primary Examiner*—Monroe H. Hayes
*Attorney, Agent, or Firm*—Fidelman, Wolffe & Waldron

[57] ABSTRACT

A cassette which can be readily mounted in a microfilm or microfiche camera adapted to store unexposed film and the film when exposed; a suction platen within the cassette adapted to hold the film at a filming station and/or a titling station within the camera. One cassette is provided to hold roll film which may be driven by a friction drive arrangement on the camera by a stepping mechanism within the cassette. Another cassette is provided to hold unexposed and exposed microfiche laminae and may be arranged to be driven in a similar fashion to the roll film cassette. A further cassette has an arrangement whereby moving of roll film is achieved by the suction platen. The camera is preferably arranged to carry several cassettes of either type and of different film widths.

3 Claims, 5 Drawing Figures

SELF-CONTAINED SINGLE OR MULTIPLE CASSETTES AND DRIVES

The present invention relates to cassettes for cameras and in particular to microfilm and microfiche cassettes and to cameras adapted to receive such cassettes.

An object of the invention is to provide a cassette which can readily be mounted in a microfilm or microfiche camera and which not only stores unexposed film but which takes up and stores the film when exposed. Therefore no transfer arrangements from the cassette and no receiving cassette need be provided. A further object of the invention is to provide an arrangement within the cassette to hold the film in an accurate and firm filming station. This again reduces the necessity for film holding arrangements within the camera. Further advantages are obtained when processing the film.

The cassette according to the invention comprises a light excluding case, mounted within the case an unexposed film retaining means and an exposed film retaining means, a suction platen adapted to hold the film at a station between the retaining means and guide means adapted to guide the film from the unexposed film retaining means over the platen to the exposed film retaining means.

In one embodiment both retaining means are reels and the film is provided as a roll of film.

In another embodiment the film is provided as separate microfiche laminae and the film is fed from one magazine which is aligned along the same axis as a second magazine.

Figure 3:
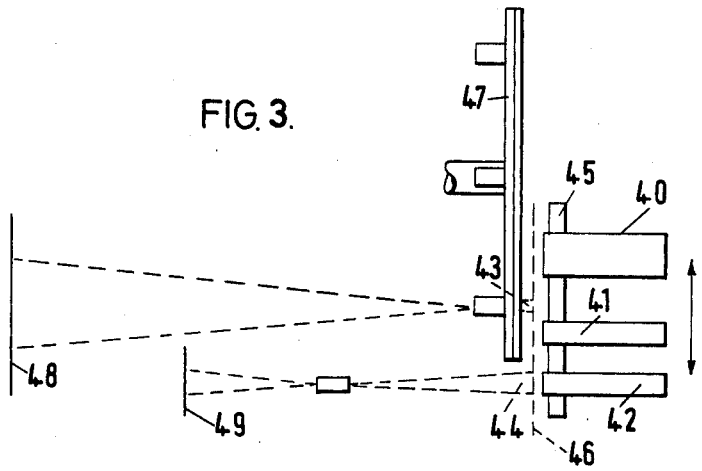
Figure 2:
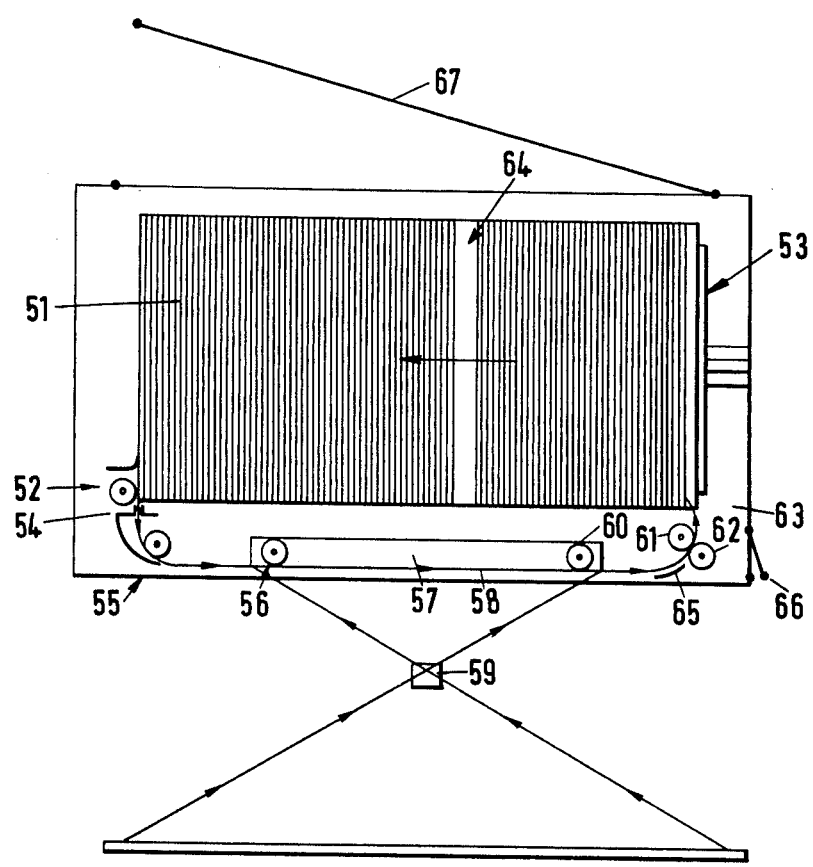
Figure 5:
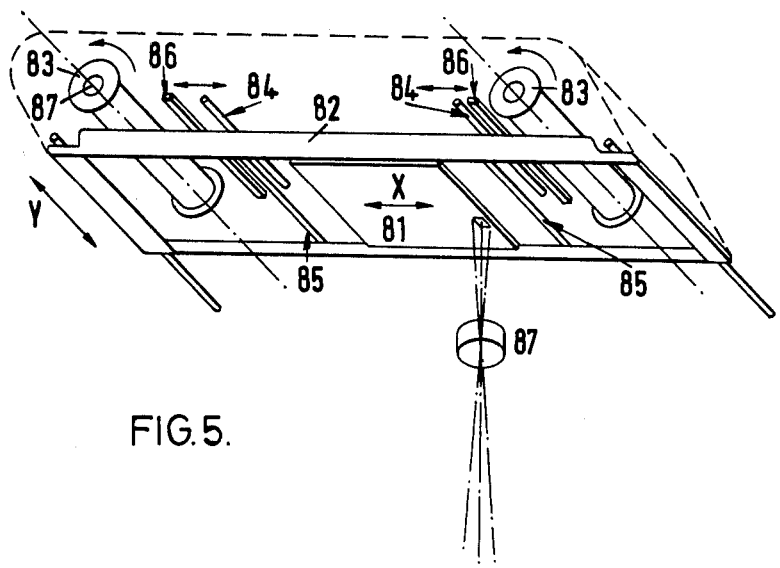
Figure 4:
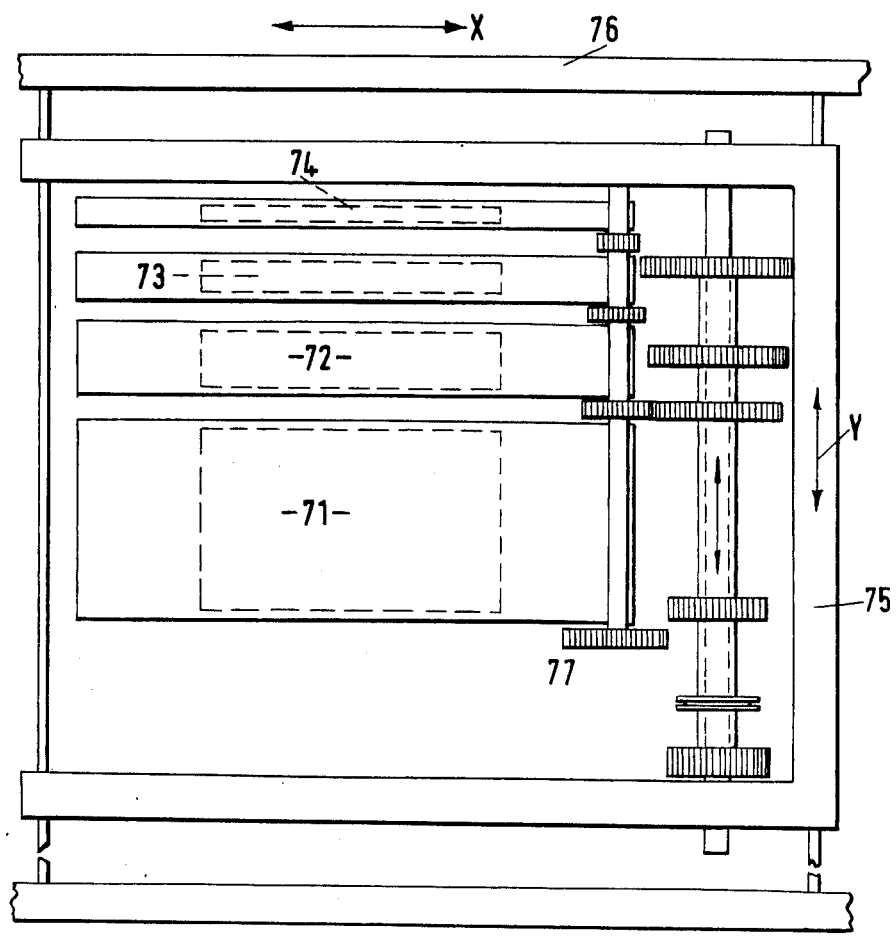

The invention will now be described with reference to the accompanying drawings in which:

FIG. 1 is a diagrammatic side view of a first cassette according to the invention inserted in a camera (shown only in part), FIG. 2 is a side view of a second cassette according to the invention, FIG. 3 is a diagram of cassettes in a camera according to the invention, showing movement of cassettes between a tilting and filming station, FIG. 4 is a diagrammatic plan view of arrangements in a camera according to the invention for moving the cassette of FIG. 1 or 2, and FIG. 5 is a diagrammatic perspective view of a third cassette according to the invention.

The first cassette shown in FIG. 1 is adapted to take roll film. The cassette basically consists of a light excluding case 1 within which is mounted an unexposed film retaining means or hub 2 and an exposed film retaining means or hub 3 and a suction platen 4. The suction platen by means of holes 5 communicating with a suction chamber 6 holds roll film 7 which is driven between hub 2 and 3 at a filming station 8 above a lens system 9 in a camera 10 which is only partly shown in FIG. 1.

The film 7 is driven from hub 2 past a tensioning roller 11 past the suction platen 4 to a guide roller 12 around a driving capstan roller 13 where a pinch roller 14 spring loaded by spring 15 maintains the film 7 in driving contact with the capstan. Hub 2 contains a friction brake. The film 7 is then wound on hub 3. Hub 3 is driven by a toothed wheel 16 (shown in dotted lines to indicate that it is outside the light excluding portion of the case 1). Wheel 16 is in turn driven by a toothed belt 17 and wheel 18. Wheel 18 is on the same shaft as and is driven by a friction wheel 19 which protrudes out of the cassette to be driven in turn by a motor driven capstan roller 20 in the camera proper.

Linked to the friction wheel 19 is a Geneva stop mechanism driven by a pin 28 on the wheel 19 engaging on a Geneva wheel 29. The Geneva wheel 29 also protrudes outside the case 1 and by means of a magnet 32 on one of its arms operates a reed switch 33 on the camera. The reed switch 33 controls the drive motor for wheel 20.

In operation the cassette is inserted into the camera, to step on the film the camera motor starts drives the friction wheel 19. The Geneva wheel 29 and capstan roller 13 are rotated and film is wound onto hub 3 against the friction brake on hub 2 ensuring the film 7 is fully tensioned. When the magnet 32 reaches switch 33 the motor is then switched off and the film is then fully stepped on.

In FIG. 3 it will be seen that several cassettes 40, 41, and 42 can be accommodated in one camera and these can be moved so that their friction wheels 19 each in turn contact a capstan roller 20 at either a main filming station 43 or a tilting station 44.

In FIG. 3 there will also be seen an activator 45 which moves the cassettes mounted one or more carriages, the filming plane 46, a lens turret 47, a record to be filmed in an object plane 48 and a titling card 49 which enables the film to be titled before or after the recording of a filmed record.

In FIG. 2 there can be seen a cassette which enables separate microfiche laminae to be fed to a filming station. In this cassette a stack 51 of laminae are urged toward front end 52 by a pushing means 53. A gate 54 controls exit of the end lamina at the front end 52. When the gate 54 is opened the end lamina is fed past rollers 55 and 56 to a suction platen 57 which holds the film lamina firmly in a filming plane 58 at a film station. When the film has been exposed to the record transmitted by camera lens 59 the film is then passed through further rollers 60, 61 and 62 to the rear end 63 of the cassette. Here the film laminae is reinserted in the stack 51 under the influence of plunger 53. Interposed between the front and rear ends of the stack is a resilient member.

In the event of a lamina being required for instant development a diverter 65 drops and allows just exposed film to leave the cassette via door 66.

A stack of laminae can be removed through top door 67.

FIG. 4 shows a cassette as described under FIG. 1 using for example 105 mm roll film in cassette 71. A similar cassette 72 for 35 mm roll film is placed alongside cassette 71. Likewise a 16 mm cassette 73 is alongside 72 and an 8 mm roll film cassette 74 is alongside 73. The carriage 75 allows a Y movement to take place, while an outer carriage 76 does the same in the X direction. A Drive for the cassettes is located at 77. If one wishes to have absolute versatility as far as the film inputs of a camera are concerned, the laminae cassette depicted in FIG. 1 or 2 can be included in the multiple film feed arrangement of FIG. 4 or similar size and type of cassettes can be used to change the sensitivity of the photographic emulsion as to speed or colour rendering.

In FIG. 5 a further cassette is shown, which although over large in size has the advantageous feature that the suction platen itself causes film stepping. This reduces friction of the film over the platen and ensures protection for the emulsion surface.

In this further cassette shown in FIG. 5 the suction platen 81 moves within a carriage 82 in the X direction assisted by film plane rollers 85. Roll film is used which is wound between spools 83 and the film is supported by spring loaded jocky rollers 84 and clamp 85. The cassette is positioned above a camera lens 87.

The film after leaving the left hand spool 83 loops round the left hand jockey roller 84 and is maintained flat on the suction platen 81 aided by rollers 85. The film then is wound in the same way through the right hand jockey roller 84 through clamp 86 onto right hand spool 83.

Having threaded the film in the manner described above and the vacuum platen is in operation, the mechanism will see to it that if the vacuum platen is on the extreme left, sufficient film is stored in the left jockey roller loop to let the carriage 82 travel to the extreme right without having to withdraw same for the delivery spool. Therefore if both spools are locked and the jockey rollers take up and delivery sufficient film corresponding to the X direction travel of platen 81 the movement of the carriage 82 is unrestricted (within the limits of the cassette) and can be freely positioned by the mechanism mentioned earlier.

When the last row and the last image of a Fiche has been reached, the spools 83 are locked and the film adheres completely to the platen, the two carriages plus the jockey rollers and appropriate length of film move. Because pictures are taken upside down, platen 81 is on the extreme right (provision for a gap between the individual Fiches is allowed for in the positioning mechanism) and therefore the jockey roller on one side is holding all the reciprocating portion of the film At this stage the take-up spool is freed and made to take-up the film held in the jockey roller. The take-up roller can either be hand operated or motor driven as desired, and after taking-up this portion of the film, is locked again. Now the film is stretched across the camera film plane, due to the film plane rollers (the take-up is still locked) and the left jockey roller is acting as a tensioning device. Then the vacuum is released and platen 81 is freed from the film and the positioning is activated, the platen can be stopped exactly on the new portion of the film so that a new complete fiche can subsequently be taken. Before this can happen the vacuum has to be re-applied so that the film is locked to the platen 81, the supply spool temporarily unlocked so that the left spring-loaded jockey roller can follow its extreme movement and take up a new supply of film. Braking arrangements on the spools as well as the film clamps 86, ensure accurate operation of the device in preventing film slip and inaccurate metering. After appropriate Y carrige movement, induced by the positioning device, the photographing stage has been reached, and the spools are locked, left hand jockey has the loop of film and a new piece of film is in position and this is held by the vacuum platen 81.

What I claim is:

1. A cassette comprising a light excluding case, an unexposed film retaining means and an exposed film retaining means both mounted within said case, said unexposed and exposed film retaining means comprising a first magazine and a second magazine respectively, each magazine adapted to hold separate microfiche laminae and each aligned along the same mutual axis, said first and second magazines separated by a resilient member to form separate compartments, said member adapted to vary the laminae storage capacity of said first and second magazines by expanding one of said compartments and contracting the other as microfiche laminae as transferred from said first magazine to said second magazine,
    a suction platen adapted to hold a microfiche lamina at a station between the retaining means, and
    guide means adapted to guide a microfiche lamina from the unexposed film retaining means over said platen to said exposed film retaining means.

2. The cassette of claim 1 wherein said guide means include gate means adapted to control exit of the end lamina in said first magazine, first roller means to feed said lamina to said platen and second roller means adapted to transfer said lamina from the platen and insert it into said second magazine.

3. A cassette comprising a light excluding case, an unexposed film retaining means and an exposed film retaining means both mounted within said case, said unexposed and exposed film retaining means comprising a first reel and a second reel respectively, each reel adapted to hold roll film; a suction platen positioned between said first and second reels, said platen being movable in a back-and-forth manner in a direction perpendicular to the axes of said reels, guide means adapted to direct a roll film from said first reel over said platen to said second reel and roller means cooperating with clamp means and adapted to withdraw a length of roll film from said first reel to form a loop containing a length of film equal to the maximum back-and-forth travel of said platen whereby movement of said platen accomplishes film stepping without movement of the film relative to the platen.

* * * * *